Oct. 31, 1933.  M. G. MARKLE  1,933,117
METHOD OF AND MEANS FOR MAKING PIPE EXTENSIONS
Filed Jan. 7, 1932  3 Sheets-Sheet 1
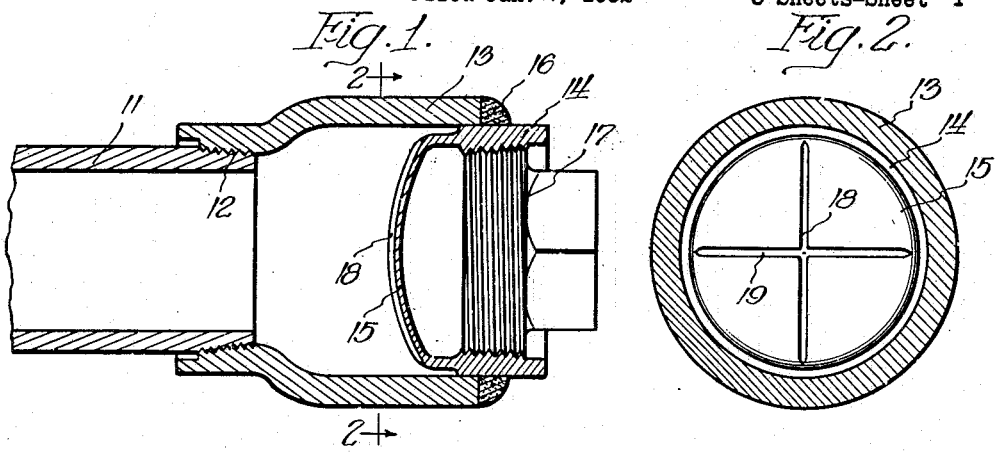
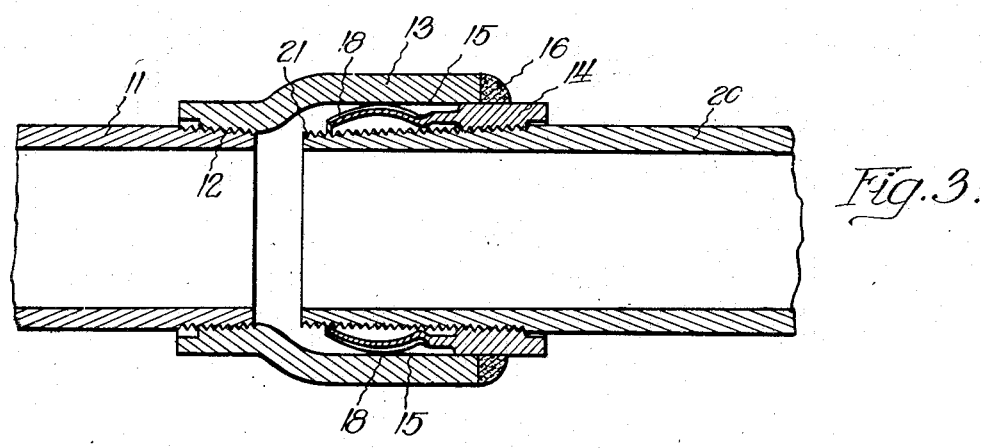
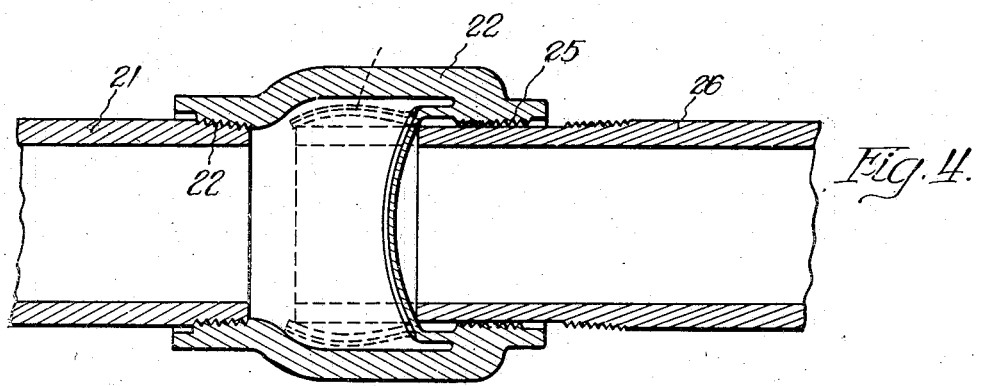
Inventor:
Matthew G. Markle
By [signature] Attys.

Oct. 31, 1933.    M. G. MARKLE    1,933,117
METHOD AND MEANS FOR MAKING PIPE EXTENSIONS
Filed Jan. 7, 1932    3 Sheets-Sheet 2
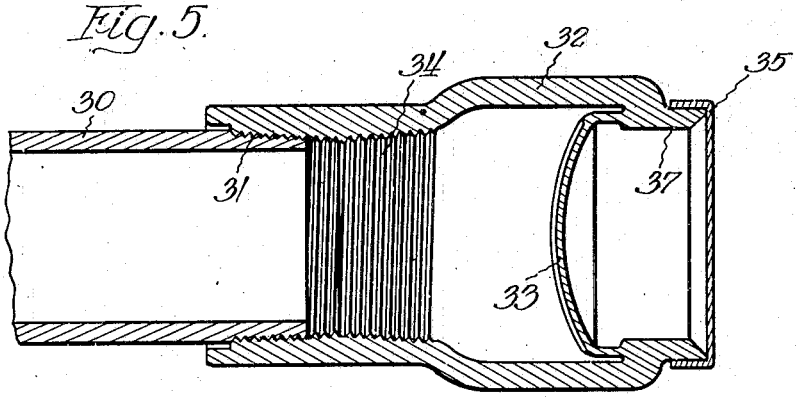
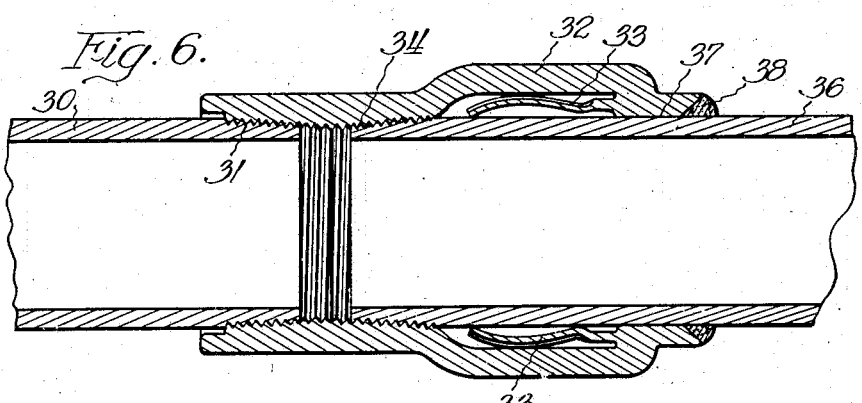
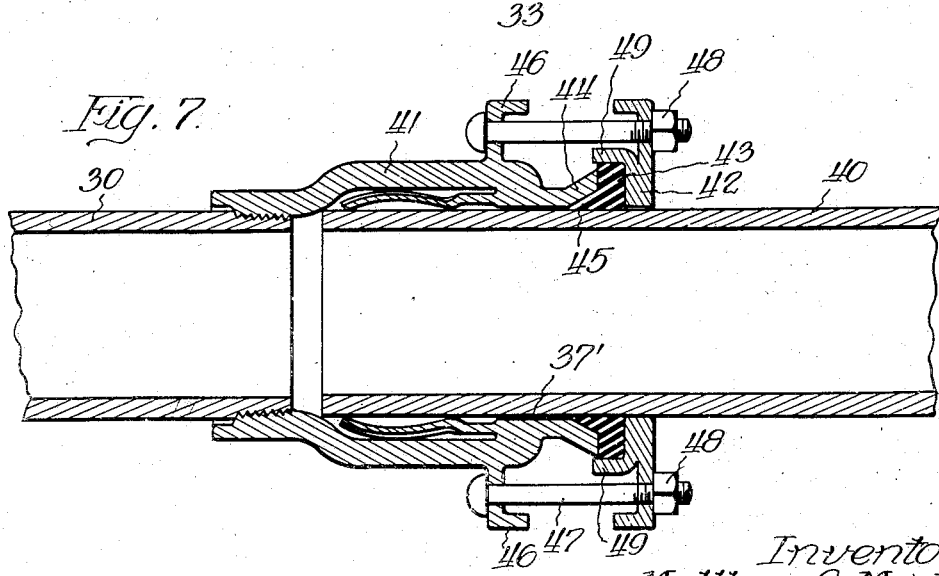
Inventor:
Matthew G. Markle

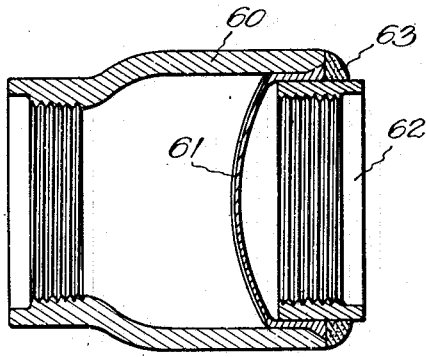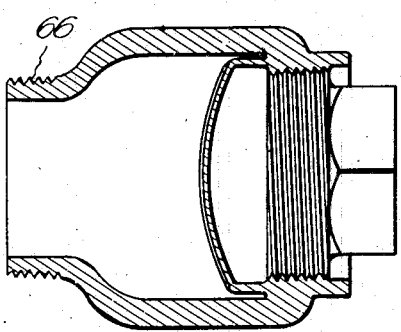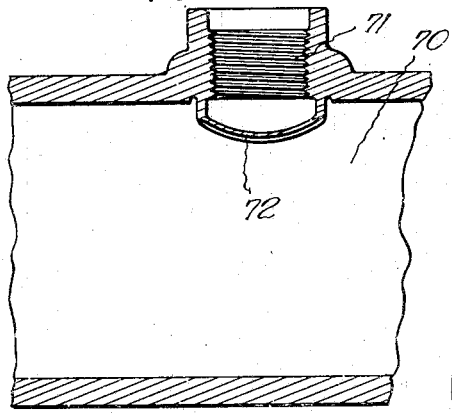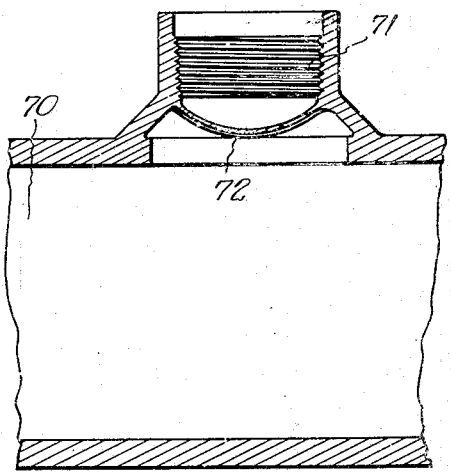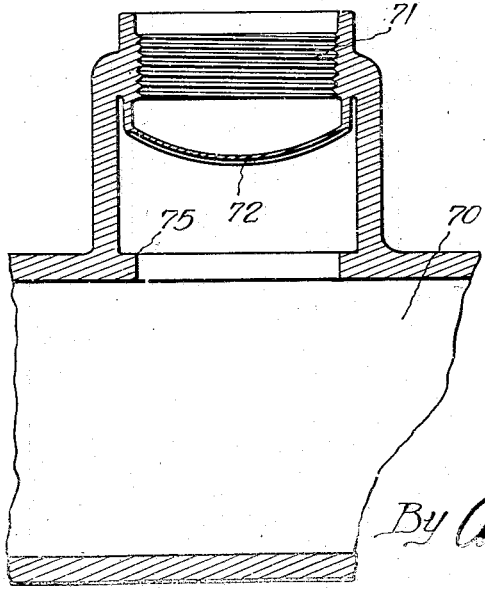

Patented Oct. 31, 1933

1,933,117

UNITED STATES PATENT OFFICE 1,933,117

METHOD OF AND MEANS FOR MAKING PIPE EXTENSIONS

Matthew G. Markle, Lake Bluff, Ill.

Application January 7, 1932. Serial No. 585,269

11 Claims. (Cl. 137—75)

My invention relates to a method and to means for extending fluid pressure carrying tubes or the like, and is particularly concerned with a novel method and with means for extending gas mains and pipe lines in general without interrupting the service.

When it is desired to connect an extension to a gas line it has heretofore been necessary to shut down the service over a part of the existing gas main and bleed the same before removing the terminal closure at the end of the main. In cases of small mains, such an extension is often made without complete service interruption, by permitting escape of the gas during the work of attaching the new extension or branch. Several objections may be raised against this practice. It is dangerous, due to the escape of the gas; it requires highly skilled reliable labor because of the speed with which the work must be accomplished; and it lowers the pressure in the gas main even under otherwise favorable conditions. Therefore, even if the service is not totally suspended, its efficiency is impaired with attending danger of serious trouble.

In order to eliminate the necessity of shutting down the service and of bleeding the gas main, or of permitting a continuous escape of gas during the making of the connection, as above described, I have invented the novel method and novel means for making a connection or extension with perfect assurance and safety, in an efficient manner, while maintaining the pressure on the old gas main.

I attach a tubular sleeve-like nipple or connector to the end of a gas main and provide in this connector a curved transversely disposed diaphragm. This diaphragm is weakened at predetermined points so that it will split apart along definite lines of cleavage responsive to mechanical pressure applied from the outside. The gas main is sealed gas-tight by this diaphragm, the gas pressure being taken by the curved diaphragm on the convex side thereof.

When it is desired to extend the old main, the extension pipe is inserted into the connector and then forced through the curved diaphragm, thereby breaking the seal. Means such as a thread in the connector, which is engaged by an external thread on the extension pipe or new main, facilitates the insertion of the extension main into the device and the forcing thereof against the diaphragm to split the same apart. The material of the diaphragm will fold back between the inside walls of the connector device and a new pipe inserted therein, thereby allowing free and unrestricted flow of the gas from the old main into the extension pipe. A secure and reliable joint is thus obtained in a highly efficient manner without service interruption and without any danger whatsoever.

I shall now describe the invention in detail with reference to the accompanying drawings, showing several embodiments thereof.

In the drawings:

Fig. 1 shows the cross-section of a terminal device secured to the end of a gas main, and a diaphragm plug secured thereto for sealing the same;

Fig. 2 is a transverse section taken along lines 2—2 of Fig. 1, looking in the direction of the arrows;

Fig. 3 illustrates, in longitudinal cross-section, a completed joint between the end of a gas main such as shown in Fig. 1 and Fig. 2 and the end of a new extension main secured thereto;

Fig. 4 shows an embodiment in which the sealing membrane or diaphragm is combined with the body of the connector sleeve. The latter is shown secured to the end of a gas main, sealing the same, and the end of the new extension main is being inserted into the diaphragm carrying sleeve connector;

Fig. 5 illustrates in section the end of a pipe main terminated by a modified form of terminator constructed in accordance with my invention;

Fig. 6 illustrates an extension of the pipe shown in Fig. 5;

Fig. 7 is a longitudinal section through a joint embodying a different form of connector;

Fig. 8 is a section taken through a modified form of connector constructed in accordance with my invention;

Fig. 9 is a sectional view through still another form of my connector; and

Figs. 10, 11, and 12 are sections through T-connectors embodying the principles of my invention.

Reference may now be had more particularly to Figs. 1, 2 and 3 of the drawings. The end of a gas main is indicated at 11. This gas main is provided with a tapering or conical thread 12 to which is secured a casing in the form of a nipple 13, as shown. A diaphragm carrying member 14 having a curved transversely extending diaphragm 15 is inserted into the nipple 13 and welded or otherwise secured thereto as indicated at 16. The gas pressure within the main 11 is exerted on the convex side of the diaphragm 15, and the end of this gas main 11 is thereby sealed gas-tight. A plug 17 is screwed into the closing or sealing member 14 in order to prevent the entry of foreign matter and unintentional injury of the membrane 15. The membrane on its convex side is weakened crosswise, as particularly indicated in Fig. 2, the incision where the membrane is weakened being indicated by the numerals 18 and 19. The incisions 18 and 19 divide the membrane into four sectors, although it is to be understood that the membrane may be divided into a larger or smaller number of sectors if desired.

When it is desired to extend the gas main 11, the plug 17 is removed from the closing member 14, thereby opening the member 14 for the insertion of an extension pipe. The end of an extension pipe is indicated at 20 and is provided with the usual tapered pipe thread for engaging the internal thread in the member 14. The pipe 20 is screwed therein, gradually advancing the pipe until its end engages the membrane 15. A further advancing of the extension pipe into the closing member 14 will cause a rupture of the membrane 15 along its lines of cleavage 18 and 19 and the sectors of the membrane will fold back between the inner walls of the housing 13 and the end of the inserted extension pipe. This condition is shown in Fig. 3. It will be seen from Fig. 3 that the tapered threaded end of the extension pipe has been screwed into the closing member 14 and gradually back therethrough until the seal has been broken. The membrane is split apart along the weakened lines 18—19 thereof by the mechanical pressure of the end of the extension pipe 20 when the same was forced through the closing member 14. As the pipe 20 is advanced the portions of the membrane are folded back between the inner walls of the connector 13 and the end of the pipe 20. The extension is completed and the gas can flow freely from the pipe 11 into the pipe 20.

The above described procedure of making an extension to an existing gas pipe is extremely simple and can be carried out quickly and easily without shutting off the service.

In Fig. 4 there is shown an embodiment of my invention in which the membrane or diaphragm is integral with the nipple or connector which is attached to the end of a gas main. It will be seen from this figure that the end of the gas main 21 is provided with a tapered pipe thread as indicated at 22 and that a closing nipple or connector is secured to the end of the gas main 21 by engaging the tapering thread at its end. This connector 22, shown in Fig. 4, is provided with an integral curved membrane or diaphragm 23 which is of the same construction as the diaphragm 15 of Fig. 1. A tapered pipe thread 25 is provided on the other side of the nipple 22 for receiving a closing plug, such as 17 shown in Fig. 1, to prevent the entrance of foreign matter and accidental injury of the diaphragm and for receiving an extension pipe when an extension is to be made.

When it is desired to make an extension, the end of the extension pipe is inserted into the connector 22 and forced through the diaphragm, thereby breaking the seal. The extension pipe is provided with a tapered pipe thread 27 spaced from the end thereof and adapted to engage the internal thread 25 in the connector 22. When the end of this extension pipe 26 is forced against the diaphragm 23 of the connector 22, the diaphragm will split apart due to the crosswise weakening and the sector portions of the diaphragm will fold back and permit the complete insertion of the pipe 26. The thread 27 will engage the internal thread 25 and the extension pipe is then threaded into the connector 22 in the same manner as was already described in connection with the first embodiment of the invention. I have indicated in dotted lines the position of the end 28 of the extension pipe when the same is completely inserted into the connector 22. It will also be seen that the corresponding portions of the ruptured diaphragm 23 have folded back between the body of the connector and the end of the extension pipe. The advantage of the embodiment shown in Fig. 4 over the one discussed in connection with Figs. 1 to 3, inclusive, resides in the combination of the diaphragm with the body of the connector. The process of welding which was necessary in the first described example is not required in the latter embodiment. A gas-tight seal is accomplished with facility and without any danger of service interruption.

Reference may now be had to Figs. 5 and 6. The connector shown in these figures differs from that shown in Fig. 4 in that it is adapted to receive a pipe which is threaded at its very end as distinguished from one wherein the pipe threads are spaced somewhat from the ends. The connector or nipple 32 is threaded onto the end of a main 30 by means of the usual tapered pipe threads indicated at 31. A tapered threaded portion 34 is adapted to receive the end of an extension pipe. The diaphragm 33, which is of a construction the same as that of the diaphragms previously described, constitutes a closure for the nipple, thereby closing off the end of the gas main. A cap 35 may be removably mounted on the end of the nipple for protecting the diaphragm against injury. When it is desired to make an extension to the main 30 the cap 35 is removed and an extension pipe is forced into the nipple. The pipe is indicated at 36 and in its initial movement into the nipple it is guided by the cylindrical guiding portion 37. As the pipe is forced into the nipple it first bears against and then ruptures the diaphragm 33. Further insertion of the pipe 36 into the nipple brings the threaded end of the pipe into engagement with the pipe threads 34. The pipe 36 is then threaded into the threads 34 to form a good joint. If desired a packing 38 may be provided between the end of the nipple 32 and the pipe 36. A similar packing may also have been formed between the nipple and the pipe 30. This packing may consist of a weld or of any other type of packing well known in the art. The threads 31 and 34 of the nipple are preferably threaded in the same direction. If desired the threads 31 and 34, however, be right and left hand threads.

It may be desirable, in certain cases, to provide a joint which does not rely on a threaded connection with the extension pipe. Such a joint is illustrated in Fig. 7. The gas main is indicated at 30 and the extension thereto is indicated at 40. A nipple 41 is secured to the gas main 30 in the usual manner. The nipple is provided with a diaphragm of the type previously described for closing off the end of the pipe 30. Before the pipe 40 is inserted into the nipple a flange 42 and a gasket 43 is slipped over the end of the pipe. The end of the connector 41 may be provided with a cap corresponding to the cap 35 of Fig. 5 for protecting the diaphragm therein. The cap is removed and the pipe 40 with the gasket 43 and the flange 42 thereon, pushed back and out of the way, is forced into the connector. After the initial movement of the pipe 40 the portion 37' of the connector serves to guide the further movement of the pipe. The pipe is forced into the connector, thereby rupturing the diaphragm in the manner previously described, until the pipe assumes the position indicated in Fig. 7. Thereafter, the gasket 43 and the locking flange 42 are moved along the pipe 40 until the gasket bears against a skirt-like extension 44 at the end of the nipple. A corresponding portion 45 of the gasket enters the space between the skirt-like extension 44 and the pipe 40. The connector 41 is provided with a number of ears 46 for receiving bolts 47 to secure the flange 42 in position. These ears may constitute individual projections extending outwardly of the body of the connector or they may form a continuous flange around the connector and provided with openings for receiving the bolts. The bolts pass through corresponding openings in the flange 42. The flange 42 is tightened towards the connector by means of nuts 48. It is to be noted that the flange 42 is provided with a rim 49 that extends over the outer end of the gasket 43. As a result, when the gasket is compressed by the tightening of the nuts the material of the gasket is forced tightly against the pipe 40 and against the inner side of the skirt 44 thus providing a good seal between the pipe 40 and the connector 41. The gasket may be made of rubber or any other suitable preferred gasket material.

In Fig. 8 I have illustrated one manner of securing a diaphragm into the end of a nipple. The nipple is indicated at 60, one end of the same being threaded whereby the nipple may be threaded onto a pipe, and the other end being free of threads and adapted to receive the diaphragm. The diaphragm is of a generally cup shape with a concave portion indicated at 61. The concave portion is provided with radially extending weakened portions dividing the same into a number of sectors in the manner illustrated in Fig. 2. The end of the diaphragm is provided with a thickened tapered rim which fits into a corresponding beveled portion within the nipple 60. The cup-shaped diaphragm is fitted over an internally threaded plug 62, making a rather tight fit therewith, and it is then inserted into the connector or nipple 60. The nipple 60, the diaphragm 61, and the plug 62 are then welded together along the end of the connector 60, as indicated by the weld 63. The weld 63 extends around the entire periphery of the plug 62 and forms a liquid-tight seal between the plug and the nipple 60. The plug 62 is internally threaded for receiving a closing plug as indicated in Fig. 1 and for receiving the threads of a pipe as indicated in Fig. 2. If desired, the internal threads in the plug 62 may be omitted and the nipple 60 provided with threads for receiving the extension pipe in the manner indicated in Figs. 5 and 6, or may be provided with an arrangement for receiving the extension pipe as illustrated in Fig. 7.

In Fig. 9 I have shown a connector wherein the end that is adapted to be connected to the existing main is externally threaded, as indicated at 66 instead of being internally threaded as indicated at Figs. 1 to 8, inclusive. The opposite end of the connector, that is the end adapted to be connected to the extension line may be of a construction such as indicated in any one of the preceding figures. I have arbitrarily indicated the same in connection with a construction such as is shown in Fig. 4. This type of connector can be used with a machine similar to the "Mueller" tapping machine and be applied in any one of a number of ways, such as: connects to a cast iron main for either a service tap or for a lateral extension of the main; connecting an extension to a main which has the usual plugged end, that is an end not previously provided with a nipple of my improved construction. It may be mentioned at this point that a "Meuller" tapping machine is a machine for drilling, tapping, and plugging a hole in a main while the main is under pressure. The machine is placed at the pipe and provides a seal at the point where it drills the hole, thereby preventing an appreciable escape of the fluid contents of the pipe. The machine then taps the hole and plugs the tapped hole with a plug that had previously been provided in the machine. The plug necessarily is externally threaded and threads into the tapped hole. The connector shown in Fig. 9 may be placed into the machine so that the threads 66 screw into the threads formed in the hole in the pipe. This type of connector is useful where it is desired to make a lateral service connection to a pipe at a point where the pipe has not been provided with a T-connection.

In Figs. 10, 11, and 12 I have shown my invention applied to three different types of T connectors to be installed on a new main for future lateral extensions. In each of these figures the portion 70 of the T forms a continuous passageway for the fluid in the pipe system, and a threaded portion 71 is provided for receiving a pipe to form a lateral connection with the main. In each case the portion 71 is closed by a diaphragm 72 which is of a construction substantially the same as that of the diaphragms previously disclosed, that is, it is provided with weakened portions extending radially outward from the center thereof to define lines of cleavage as illustrated in Fig. 2. In each case the extension 71 is adapted to be covered by a cap similar to the cap indicated at 35 in Fig. 5, for protecting the diaphragm against external injury prior to the making of the extension to the main. In each case the extension is made by threading the end of a pipe into the threads 71 and continuing this operation until the pipe pierces and ruptures the diaphragm 72 in the manner previously described. In the form of my invention illustrated in Fig. 10 the extension pipe protrudes into the main 70 by an appreciable amount and therefore this form should be used only where the diameter of the main 70 is rather large, or large in comparison with the diameter of the extension pipe. In the form illustrated in Fig. 11 the extension pipe barely protrudes into the main whereas in the form illustrated in Fig. 12 the extension pipe does not extend into the main 70 at all. For this reason the T-connector shown in Fig. 12 is provided with a peripheral shoulder, as indicated at 75, for limiting the extent to which the lateral extension may be projected to the connector.

In compliance with the requirements of the patent statutes I have herein shown and described a few preferred embodiments of my invention. It is however to be understood that the invention is not limited to the precise embodiments herein shown, the same being merely illustrative of the principles of the invention.

What I consider new and desire to secure by Letters Patent is:

1. In combination with a pipe, means for making a fluid-tight communicating pipe connection therewith and a fragile seal for said means, said seal being weakened along radial lines to adapt it to be pierced into a number of sectors responsive to the making of a connection with the pipe, each of said sectors remaining joined to said means.

2. A pipe connector, a portion of which is adapted to have a pipe telescoped thereinto and including means for guiding a pipe in its telescoping movement, a fragile metallic diaphragm within the connector at the end of the guiding means and adapted to be pierced by a pipe telescoping into the guiding means, the portion of the connector adjacent the diaphragm being of an enlarged diameter and constituting a pocket for the diaphragm parts when the diaphragm is pierced by a pipe.

3. A nipple for joining two pipes, said nipple being adapted to be joined to a pipe at one end and having a pipe receiving opening at the other end, a diaphragm closing off said other end, said diaphragm being weakened along lines extending radially outward from the center thereof and being adapted to be pierced by a pipe inserted into said pipe receiving opening, said nipple having a portion of enlarged diameter defining with a pipe inserted into the opening a pocket for receiving the parts of the pierced diaphragm.

4. A nipple threaded to receive two pipes one inserted from one end of the nipple and the other from the other end of the nipple, said nipple being extended at one end beyond the threaded portion and including a pipe guiding formation at its remote end, and a fragile diaphragm between the pipe guiding portion and the threaded portion and constituting a liquid-tight seal, the diaphragm being of a greater diameter than the diameter of the pipe guiding formation, whereby a pipe inserted through the guiding formation, engages the diaphragm along points spaced from the periphery thereof.

5. A nipple threaded to receive two pipes one inserted from one end of the nipple and the other from the other end of the nipple, said nipple being extended at one end beyond the threaded portion and including a pipe guiding formation at its remote end, and a fragile diaphragm between the pipe guiding portion and the threaded portion and constituting a liquid-tight seal, the portion of the nipple between the diaphragm and the threaded portion being of an enlarged diameter, and said diaphragm being weakened along radial lines outward from the center whereby the same is adapted to be broken into sectors and bent along its circumference into said enlarged portion.

6. A pipe connector including an outlet for forming a lateral communication with a pipe, and a diaphragm closing said outlet and adapted to be ruptured upon the extension of a pipe into the outlet, said diaphragm forming a fluid-tight seal for said outlet, and being of a larger diameter than the diameter of the outlet and adapted to flex along an arc of a diameter greater than the diameter of the outlet.

7. A pipe connector adapted to be connected to a pipe and having a communicating outlet for connection with another pipe, a diaphragm within the connector and forming a fluid tight closure for said outlet, said diaphragm being adapted to be ruptured by the insertion of a pipe into the outlet for communicating connection with the first mentioned pipe, said diaphragm being weakened along definite radial lines to cause it to break into a plurality of segments which remain joined with the connector.

8. In a piping system containing fluid under pressure, means for making a communicating connection with the system while the system is under pressure, said means comprising a connector communicating with the interior of the piping system and having an opening for receiving a connecting pipe, a sealing diaphragm within the connector and spaced from the pipe receiving opening, a protective closure at said opening for protecting the diaphragm, said diaphragm being adapted to be pierced by the advancement of the connecting pipe in said opening after removal of the closure, and being weakened along radial lines to define lines of rupture and prevent severance of the diaphragm from the connector upon advancement of the connecting pipe.

9. A pipe connector having a pipe receiving opening and, within the connector and adjacent the opening, a portion of a larger diameter than said opening, a diaphragm extending across said portion of larger diameter and forming a fluid tight closure for the pipe receiving opening, said diaphragm being adapted to be pierced by a pipe fitted into the opening, and being held along its periphery at the portion of enlarged diameter whereby a pipe that makes a close fit with said opening engages the diaphragm at points spaced from the periphery thereof.

10. In combination, a main, a connector having one end connected to the main and having a portion adapted for reception of the end of an extension pipe, and a diaphragm extending across the pipe receiving portion and providing a fluid tight and pressure resistant closure therefor, the diaphragm being permanently secured at its periphery to the connector and adapted to be initially ruptured at its central portion and thereafter split open by the end of the extension pipe while maintaining the connection between the periphery of the diaphragm and the connector, whereby communication between the main and the extension is accomplished while the diaphragm remains secured to the connector.

11. A connector for establishing communication between a main pipe and and an extension pipe, said connector comprising a casing for securement at one end to the main pipe and having a portion adapted for reception of an end of the extension pipe, and a ductile diaphragm extending across the extension pipe receiving portion and normally providing a fluid tight and pressure resistant closure therefor, the diaphragm being permanently secured at its periphery to the casing and adapted to be ruptured and split apart from its central portion toward its periphery, while remaining attached at its periphery to the casing, when subjected to pressure by the end of the extension pipe during insertion of the latter into the connector.

MATTHEW G. MARKLE.